US007205478B2

(12) United States Patent
Kline

(10) Patent No.: US 7,205,478 B2
(45) Date of Patent: Apr. 17, 2007

(54) ACTIVE DEVICE THREAD ELECTRICAL CONNECTIONS

(75) Inventor: Eric V. Kline, Clinton Corners, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/905,010

(22) Filed: Dec. 9, 2004

(65) Prior Publication Data

US 2006/0124340 A1 Jun. 15, 2006

(51) Int. Cl.
*H02G 15/08* (2006.01)

(52) U.S. Cl. ................................ 174/88 R; 174/129 R

(58) Field of Classification Search ............ 174/129 R, 174/133 R, 128.1, 88 R
See application file for complete search history.

(56) References Cited

U.S. PATENT DOCUMENTS 1,951,654 A * 3/1934 Green ......................... 72/339
2,622,314 A * 12/1952 Bergan ........................ 29/517
3,644,663 A * 2/1972 Carlson .................... 174/88 B
3,829,602 A * 8/1974 Ishikawa et al. ........ 174/102 R
4,407,065 A * 10/1983 Gray ........................... 29/828
4,468,089 A * 8/1984 Brorein ...................... 385/114
5,732,875 A * 3/1998 Ziemek et al. .............. 228/148
6,210,771 B1 4/2001 Post et al.
6,437,422 B1 8/2002 Solomon et al.
6,547,606 B1 * 4/2003 Johnston et al. ............ 439/708
2003/0068559 A1 4/2003 Armstrong et al.

* cited by examiner

*Primary Examiner*—Chau N. Nguyen
(74) *Attorney, Agent, or Firm*—Jay H. Anderson; Hoffman, Warnick & D'Alessandro LLC

(57) ABSTRACT

Methods and an active device thread system are disclosed for electrically connecting an active device thread to an output. In one embodiment, an active device thread includes a substantially conical end that has elements of the thread exposed for coupling to a mating portion of an output. In an alternative embodiment, an active device thread includes a tapered cut that has elements of the thread exposed for coupling to a mating portion of an output. The invention also includes an active device thread system including an electrical connection including one of a substantially conical end that exposes at least two elements of the active device thread and a tapered cut that exposes at least two elements of the active device thread, and a mating portion on an output.

11 Claims, 9 Drawing Sheets

ACTIVE DEVICE THREAD ELECTRICAL CONNECTIONS

FIELD OF THE INVENTION

The present invention relates generally to semiconductor devices, and more particularly, to methods and a structure for making electrical connections to active device threads.

BACKGROUND OF THE INVENTION

As the miniaturization of electrical circuits has progressed, it has become possible to provide an electrical circuit as an active device thread that can be woven into fabrics. One approach is disclosed in U.S. Pat. No. 6,437,422 to Solomon et al., assigned to the same assignee as the present application. This reference discloses the basic art of semiconductor active devices as threads. Challenges regarding implementation of active device threads still exist, however. One challenge is making electrical connection to the active device threads, which is necessary to electrically connect the active device thread to an output such as a scaling module or another active device thread.

In view of the foregoing, there is a need in the art for electrical connections to active device threads.

SUMMARY OF THE INVENTION

The invention includes methods and an active device thread system for electrically connecting an active device thread to an output. In one embodiment, an active device thread includes a substantially conical end that has elements of the thread exposed for coupling to a mating portion of an output. In an alternative embodiment, an active device thread includes a tapered cut that has elements of the thread exposed for coupling to a mating portion of an output. The invention also includes an active device thread system including an electrical connection including one of a substantially conical end that exposes at least two elements of the active device thread and a tapered cut that exposes at least two elements of the active device thread, and a mating portion on an output.

A first aspect of the invention is directed to a method of electrically connecting a first active device thread to an output, the method comprising the steps of: providing an electrical connection area including a substantially conical end on the first active device thread that exposes at least two elements of the first active device thread; and electrically connecting the exposed elements to the output.

A second aspect of the invention includes a method of electrically connecting a first active device thread to an output, the method comprising the steps of: providing an electrical connection area including a tapered cut on the first active device thread that exposes at least two elements of the first active device thread; and electrically connecting the exposed elements to the output.

A third aspect of the invention relates to an active device thread connector system comprising: an electrical connection for electrically connecting an active device thread to an output, the electrical connection including one of: a) a substantially conical end that exposes at least two elements of the active device thread, and b) a tapered cut that exposes at least two elements of the active device thread; and a mating portion on the output.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF PREFERRED EMBODIMENTS

Figure 1:
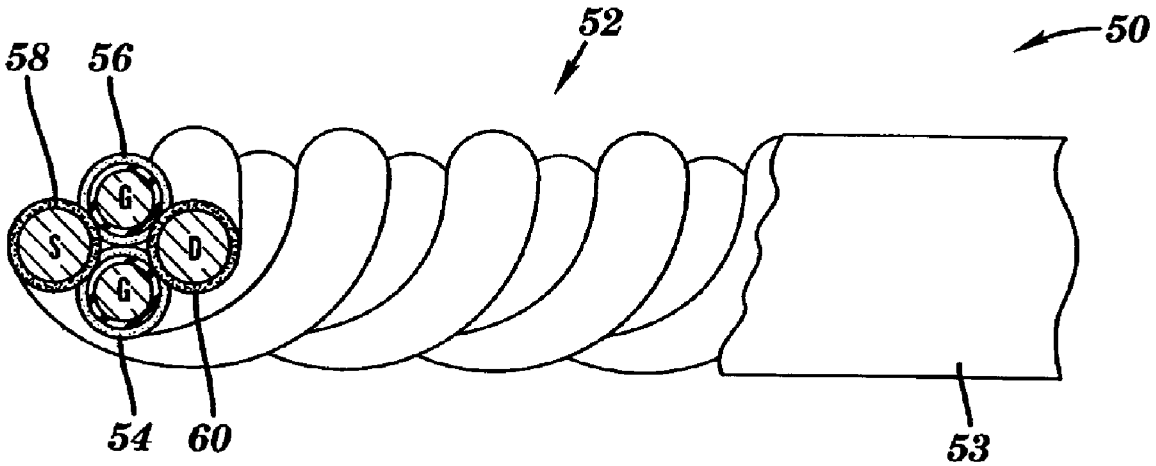
FIG. 1 PRIOR ART
FIGS. 1–10 show conventional active device threads.
Figure 2:
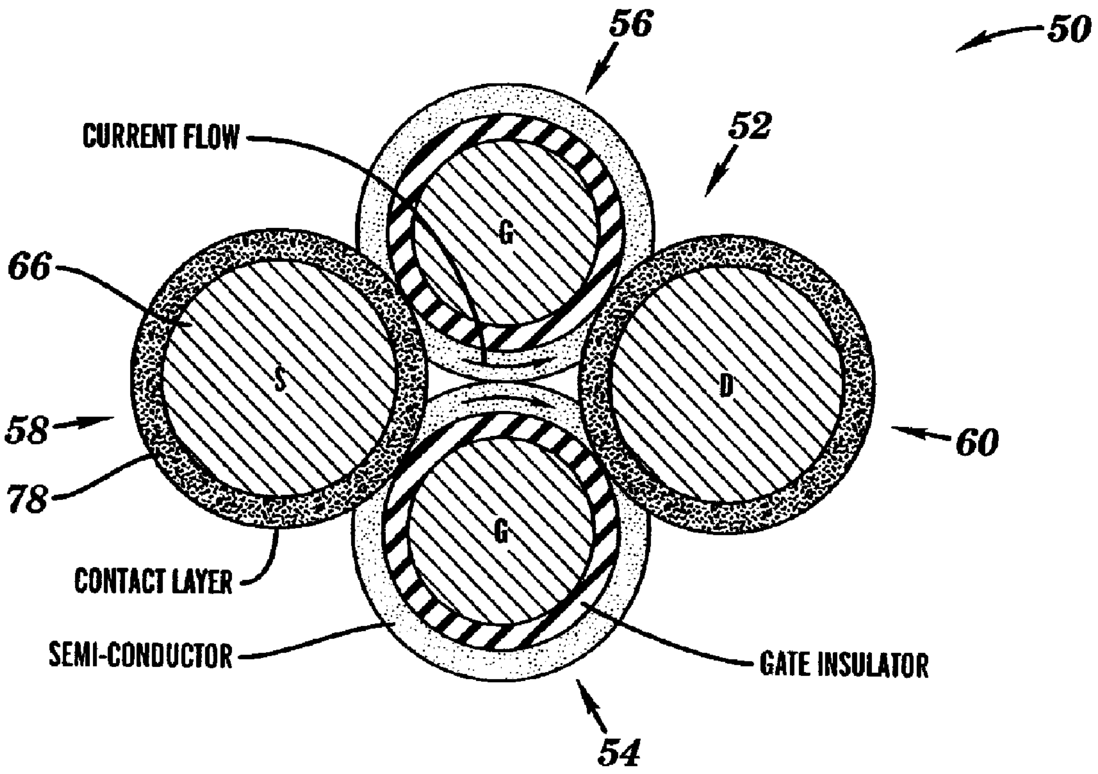
FIG. 2 PRIOR ART
Figure 3:
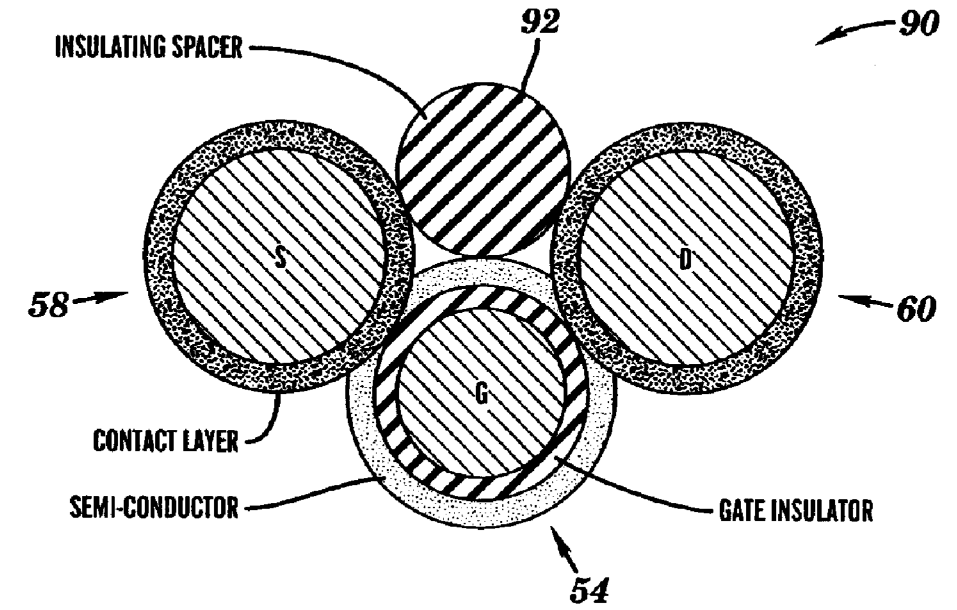
FIG. 3 PRIOR ART
Figure 4:
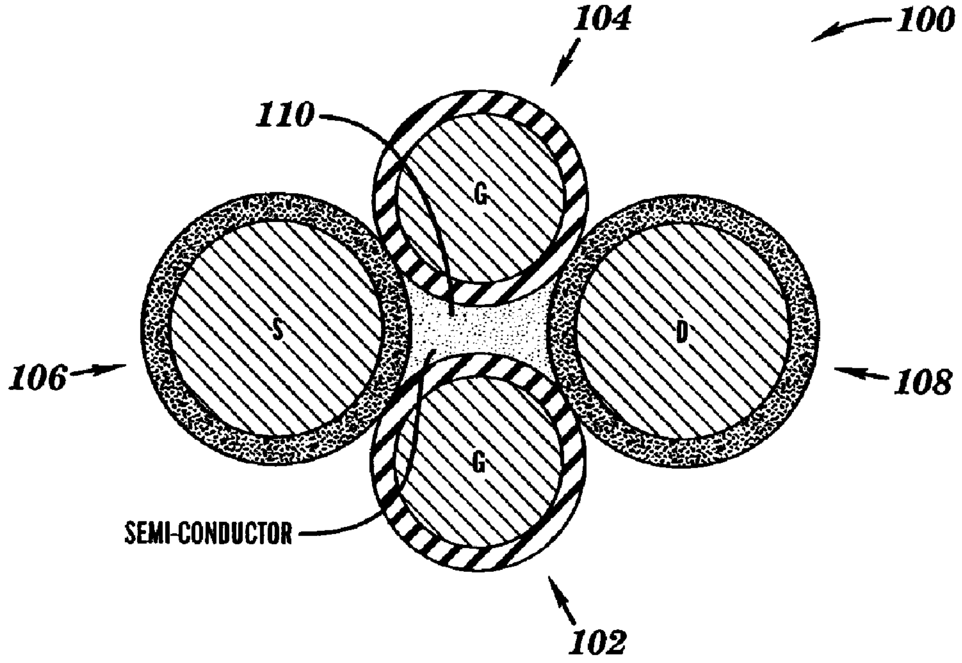
FIG. 4 PRIOR ART
Figure 5:
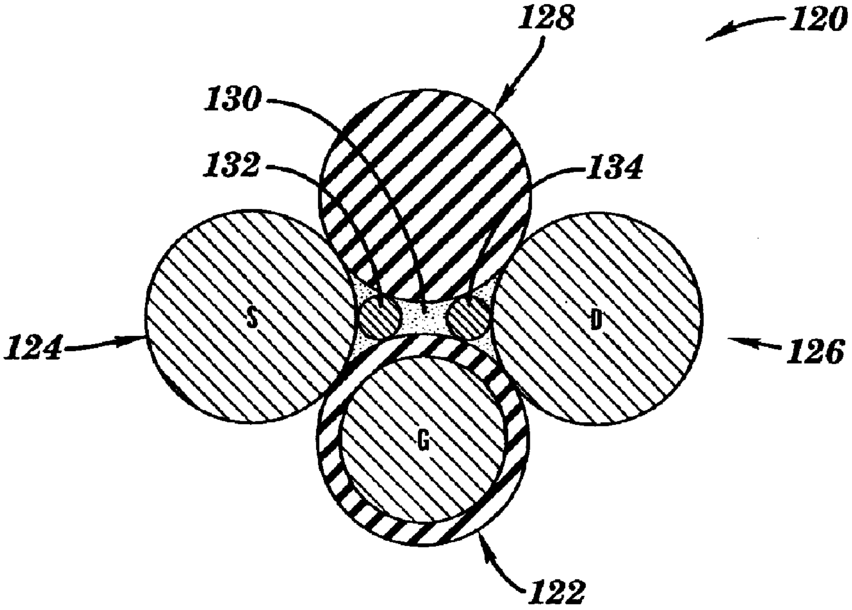
FIG. 5 PRIOR ART
Figure 6:
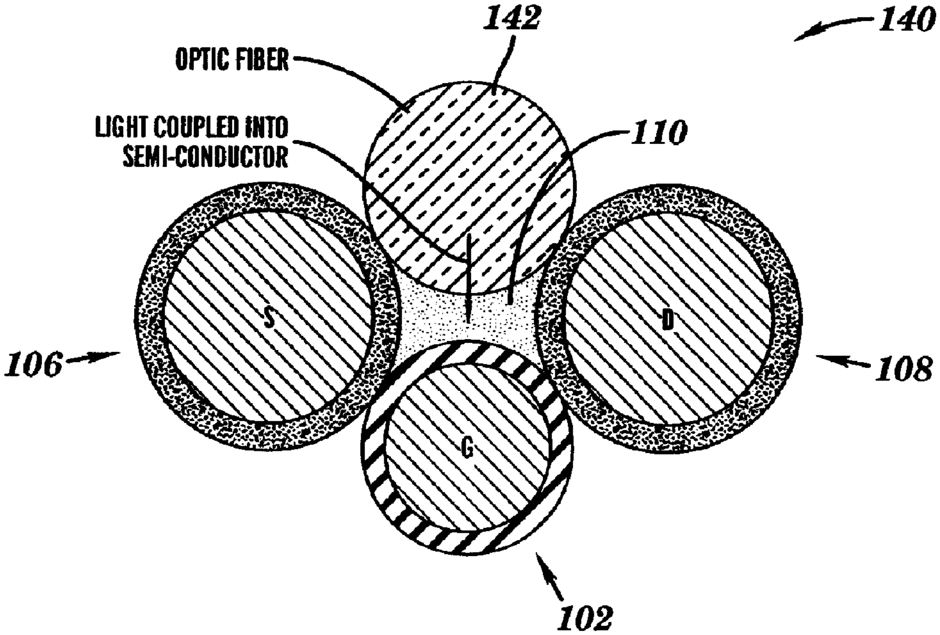
FIG. 6 PRIOR ART
Figure 7:
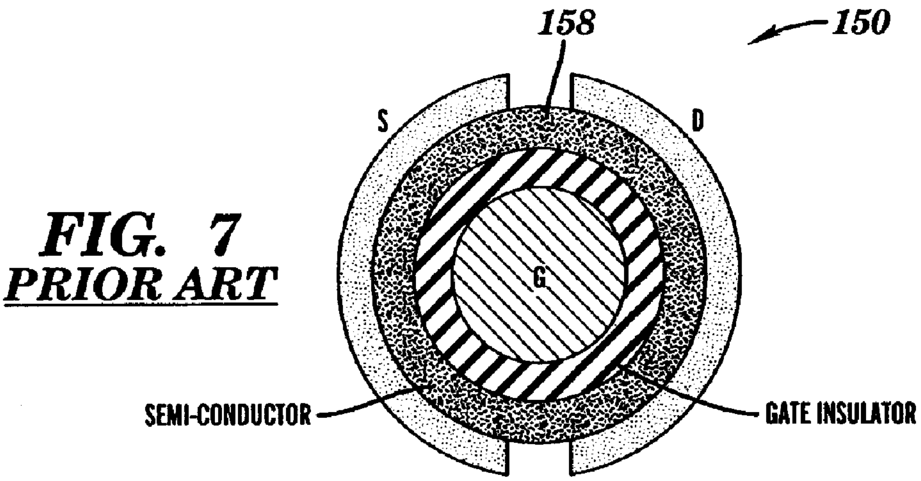
FIG. 7 PRIOR ART
Figure 8:
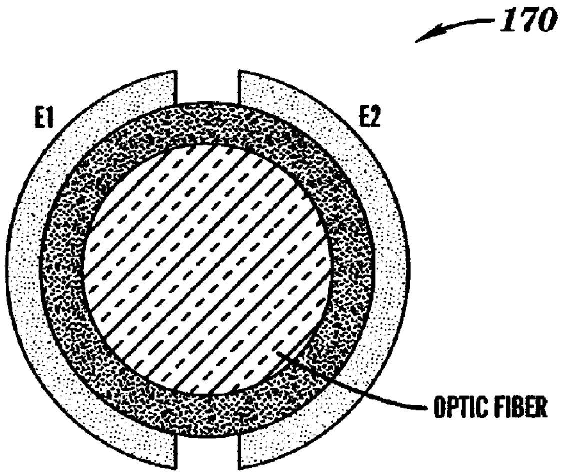
FIG. 8 PRIOR ART
Figure 9:
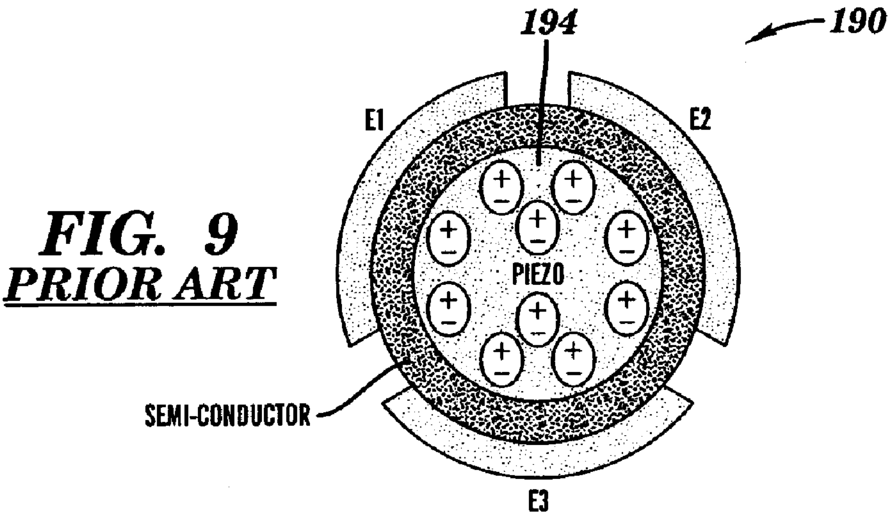
FIG. 9 PRIOR ART
Figure 10:
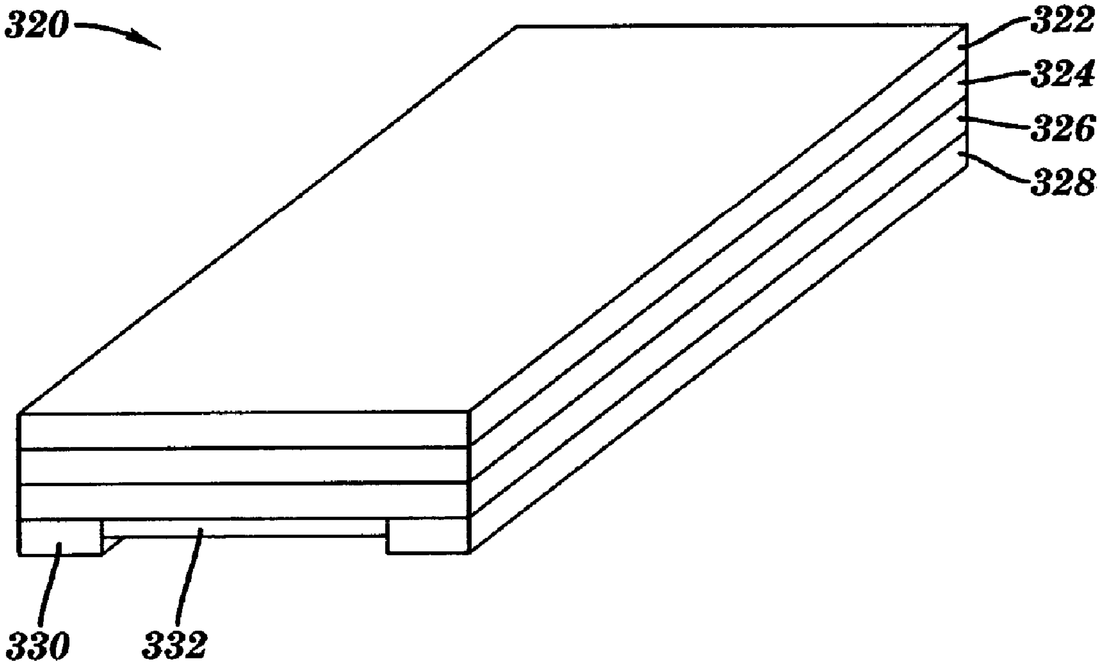
FIG. 10 PRIOR ART

With reference to the accompanying drawings, FIGS. 1–10 illustrate conventional active device threads according to U.S. Pat. No. 6,437,422 to Solomon et al., the disclosure of which is hereby incorporated by reference. As shown in FIGS. 1–10, each active device thread 50, 90, 100, 120, 140, 150, 170, 190 and 320 may include at least one constituent thread. For example, as shown in FIG. 1, a bundle 52 of constituent threads includes a sheath 53. Constituent threads may vary depending on the application for the active device threads. As a brief overview, constituent threads may include, for example: a source thread 58, 106, 124 (FIGS. 1–6), a drain thread 60, 108, 126 (FIGS. 1–6), a gate thread 54, 56, 102, 104, 122 (FIGS. 1–6), an optical thread 142 (FIG. 6), a spacer thread 92, 128 (FIGS. 3, 5), a contact thread 132, 134 (FIG. 5), a piezo-electric thread 194 (FIG. 9) and/or a semiconductor thread 110, 130 (FIGS. 4–6). Each constituent thread may also include layers. For example, as shown in FIG. 2, a source thread 58 may include a source core 66 and a contact layer 78, or the entire active device thread may be provided as layers, as shown in FIGS. 7–9. As shown in FIG. 10, active device thread 320 may also have a ribbon geometry including a plurality of layered elements 322, 324, 326, 328, 330, 332. For purposes of description, any part of an active device thread that has electrical significance shall be referred to as an "element," i.e., cores and/or layers are cumulatively referred to as elements of active device thread 50. "Active device threads" as used herein are in the size range of a diameter of 10–250 μm. substantially conical end includes a complementary substantially conical end.

Referring to FIGS. 11–15, the inventive method of electrically connecting an active device thread 50 to an output will now be described relative to active device thread 50 of FIGS. 1–2. While the invention will be described relative to particular embodiments of the Solomon et al. reference, it should be understood that the invention is applicable to a wide variety of active device threads.

Figure 11:
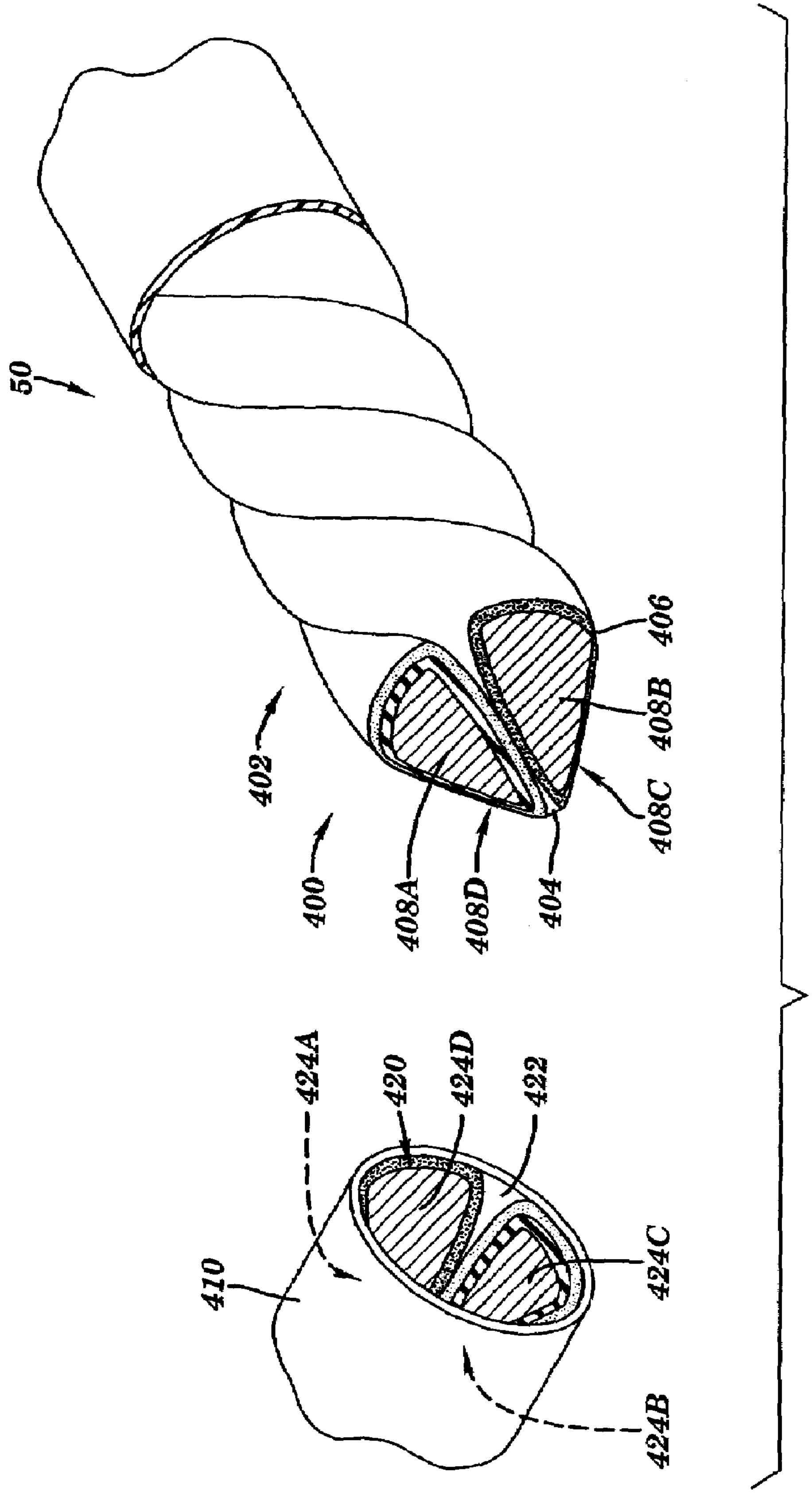
FIG. 11 shows the active device thread of FIG. 1 including an electrical connection area according to a first embodiment of the invention.
Figure 13:
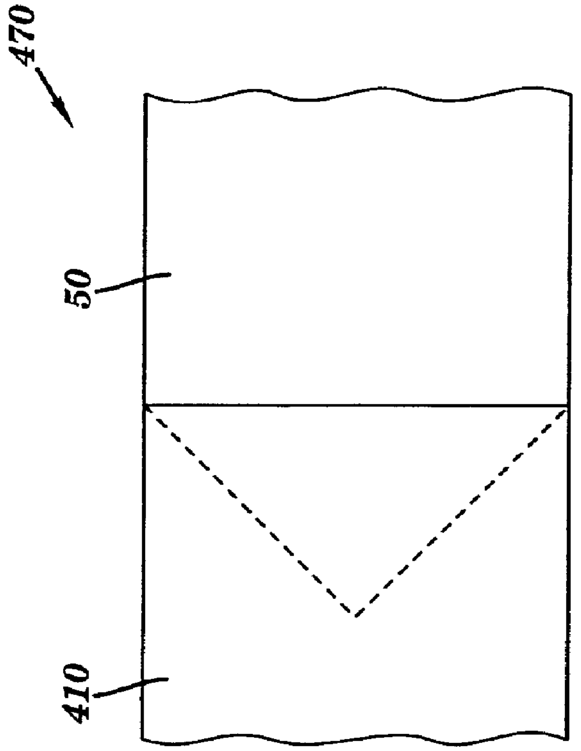
FIG. 13 shows an electrical connection according to the FIG. 11 embodiment.
Figure 12:
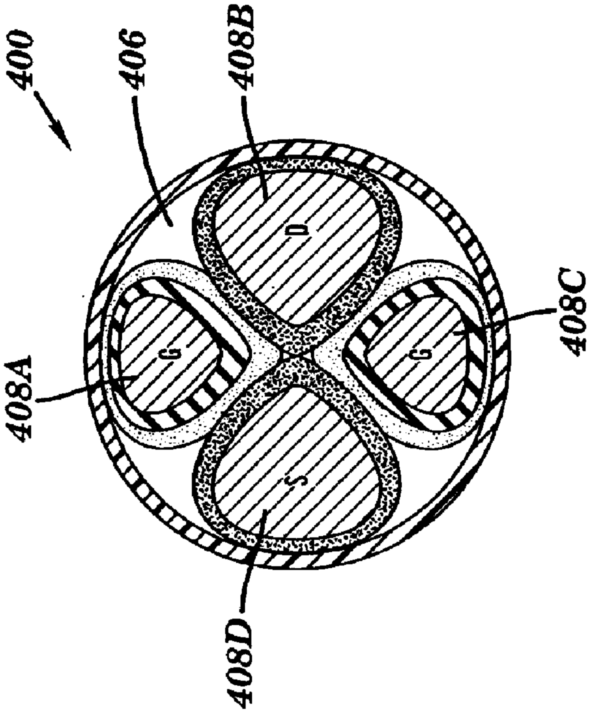
FIG. 12 shows an electrical connection area of the active device thread of FIG. 11.

As illustrated in FIGS. 11–13, the method includes providing an electrical connection area 400 on an end 402 of an active device thread 50. In the embodiment shown in FIG. 11, electrical connection area 400 includes a substantially conical external end 404 that exposes at least two elements 408A–D of active device thread 50. As shown, at least two elements of each constituent thread of active device thread 50 are exposed, but there may be more or fewer exposed elements depending on the type of active device thread and the desired connections to be made.

Next, as shown in FIG. 13, exposed elements 408A–D (FIG. 11) are electrically connected to an output 410. In one embodiment, as shown in FIG. 11, output 410 may include a complementary, internally substantially conical end 420 having a mating portion 422 including a coupling 424A–D for each exposed element 408A–D or as many exposed elements 408A–D as necessary. In this case, the electrical connection is made by mating the substantially conical ends 404, 420 together. That is, connection is made such that exposed elements 408A–D and couplings 424A–D meant for interconnection are in contact. Any now known or later developed mechanism for retaining the ends in contact may be used, e.g., soldering. It should be recognized relative to this embodiment that either part (i.e., active device thread 50 or output 410) may be externally conical and the other internally conical. In an alternative embodiment, a conically shaped output may be omitted, and other electrical connections, such as metal wires, can be coupled to each element 408A–D, as required. Wire connections may be made, for example, by bonding or adhesive bonding via the sheaths. It should be recognized that "output" as used herein may include another active device thread, as described above, or other structures such as a connector or a scaling module for scaling up or down to active device thread 50. Accordingly, the invention should not be limited to the particular output illustrated.

Figure 14:
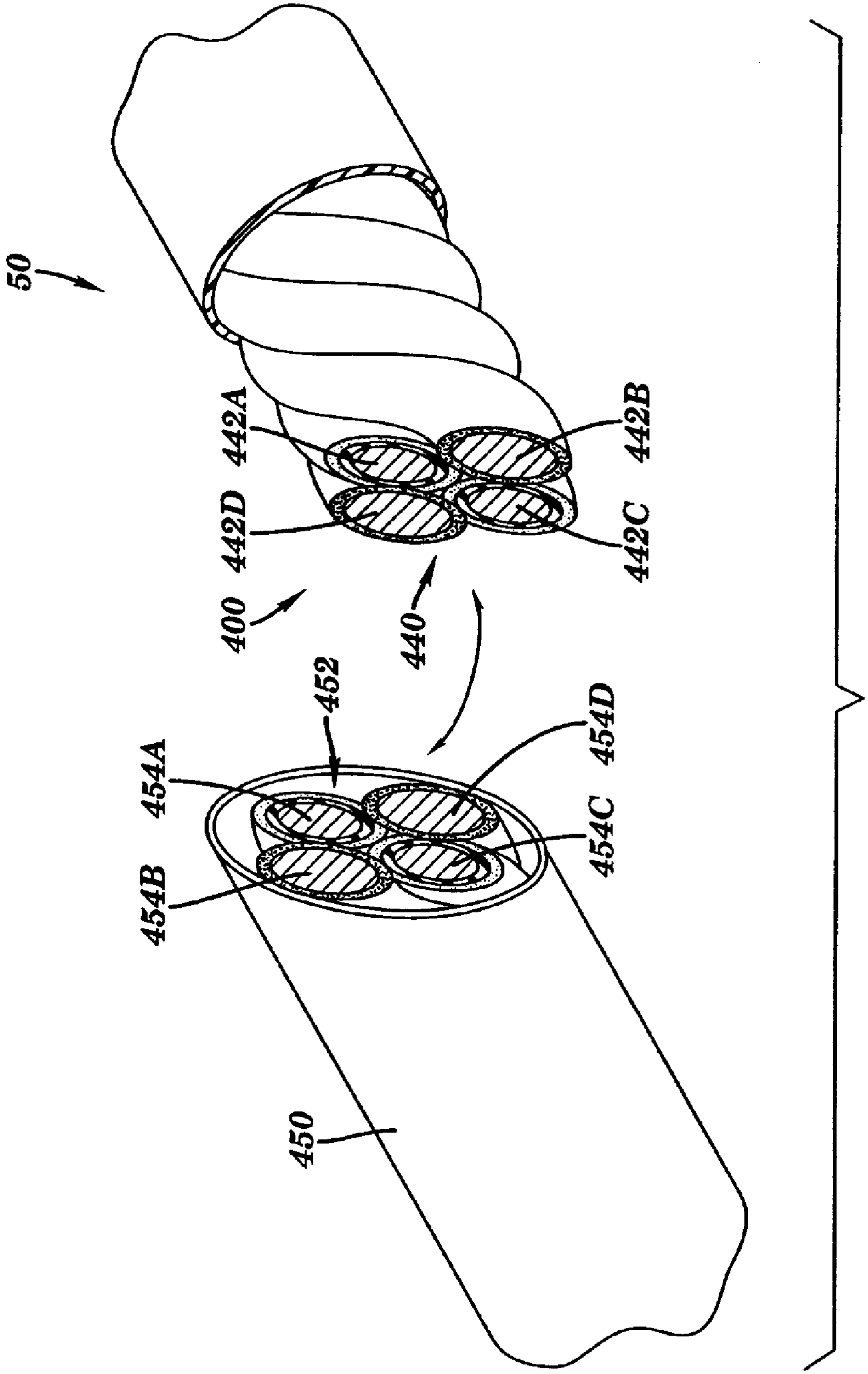
FIG. 14 shows the active device thread of FIG. 1 including an electrical connection area according to a second embodiment of the invention.
Figure 15:
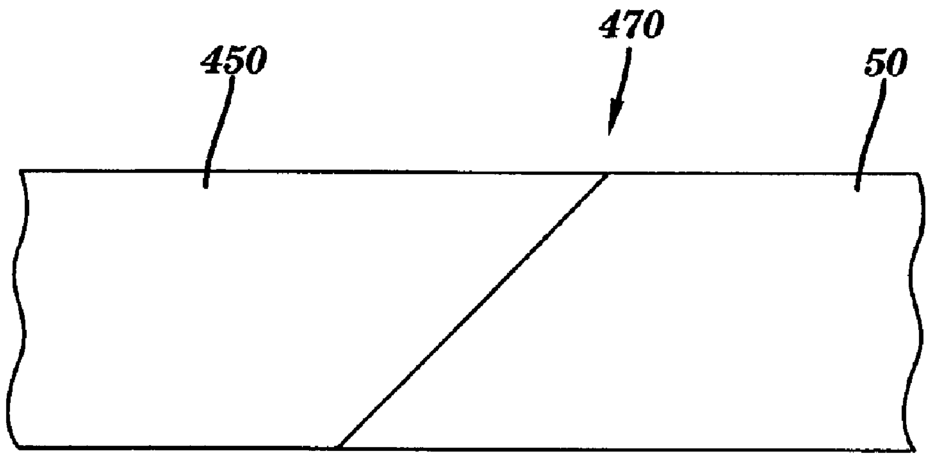
FIG. 15 shows an electrical connection according to the FIG. 14 embodiment.

Turning to FIGS. 14–15, electrical connection area 400 may alternatively include a tapered cut 440 that exposes at least two elements 442A–D of active device thread 50. Similarly, output 450 may have a complementary tapered cut 452 formed thereon having a mating portion 452 including a coupling 454A–D for each exposed element 442A–D or as many exposed elements 442A–D as necessary. In one embodiment, as shown in FIG. 15, electrical connection 470 is made by mating output 410 and active device thread 50, i.e., tapered cuts 440, 452 (FIG. 14) together so that exposed elements 442A–D (FIG. 14) and couplings 454A–D (FIG. 14) that are meant for interconnection are in contact. Any now known or later developed mechanism for retaining the ends in contact may be used, e.g., soldering. In an alternative embodiment, a conically shaped output may be omitted, and other electrical connections, such as metal wires, can be coupled to each element 442A–D, as required. Again, wire connections may be made, for example, by bonding or adhesive bonding via the sheaths. As also mentioned above, the output here may include another active device thread, as described above, or other structures such as a connector or a scaling module for scaling up or down to active device thread 50.

Figure 16:
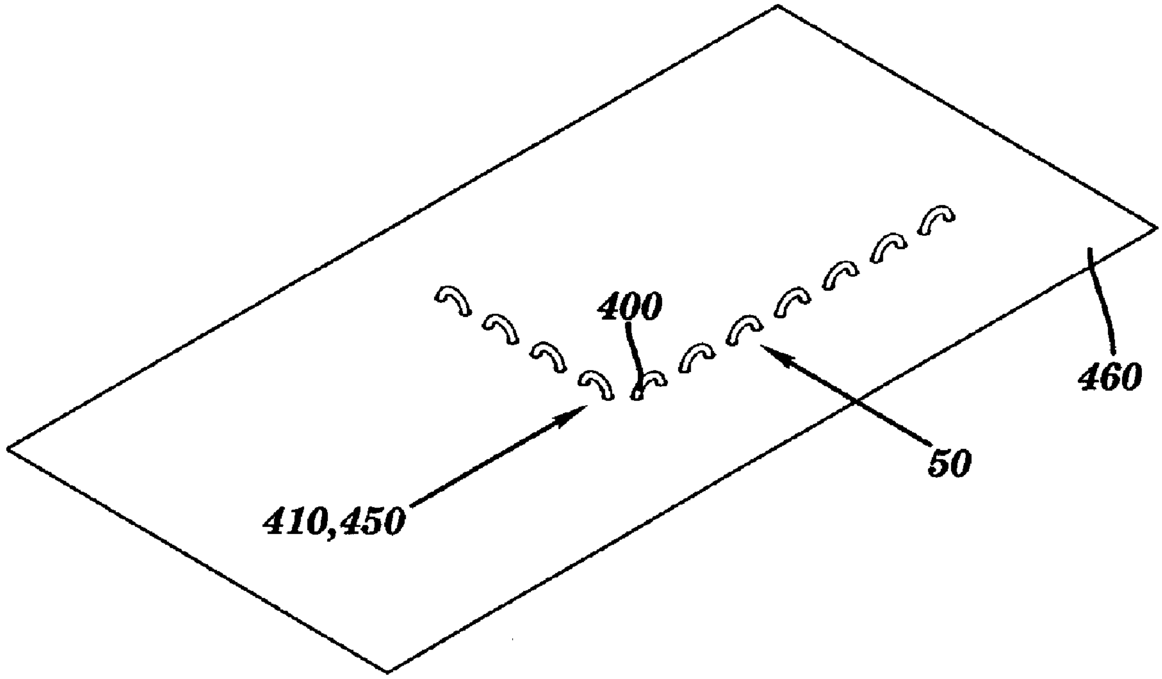
FIG. 16 shows an active device thread and output woven into a piece of fabric.

In one embodiment, as shown in FIG. 16, at least one of active device thread 50 and output 410, 450 are woven into a pre-existing fabric 460 prior to the electrically connecting step, in any now known or later developed fashion. However, this is not necessary.

The invention also includes an active device thread connection system 470, as shown in FIGS. 13 and 15 including: an electrical connection area for electrically connecting an active device thread 50 to an output 410, 450. The electrical connection area includes one of a substantially conical end 406 (FIG. 11) that exposes at least two elements 408A–D (FIG. 11) of active device thread 50 and a tapered cut 440 (FIG. 14) that exposes at least two elements 442A–D (FIG. 14) of active device thread 50. In addition, the electrical connection includes a mating portion 422 (FIG. 11), 452 (FIG. 14) on output 410, 450.

The above-described embodiments may be used alone or in combination relative to an active device thread.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of electrically connecting a first semiconductor active device thread to an output, the method comprising the steps of:

providing an electrical connection area that includes a substantially conically-shaped external end that exposes at least two elements of the first semiconductor active device thread; and electrically connecting the exposed elements to the output, wherein the output includes a second semiconductor active device thread, wherein each of the semiconductor active device threads includes a plurality of constituent threads, each having at least two exposed elements.

2. The method of claim 1, further comprising providing a complementary substantially conical end on the output having a mating portion including a coupling for each of the exposed elements, wherein the electrically connecting step includes mating the substantially conical ends together such that the couplings contact the exposed elements.

3. The method of claim 1, further comprising the step of weaving at least one of the semiconductor active device threads into a pre-existing fabric prior to the electrically connecting step.

4. The method of claim 1, wherein the plurality of constituent threads includes at least two of: a source thread, a drain thread, a gate thread, an optical thread, a spacer thread, a contact thread and a semiconductor thread.

5. A method of electrically connecting a first semiconductor active device thread to an output, the method comprising the steps of:

providing an electrical connection area including a tapered cut on the first semiconductor active device thread that exposes at least two elements of the first semiconductor active device thread, wherein each of the semiconductor active device threads includes a plurality of constituent threads, each having at least two exposed elements;

providing a complementary tapered cut on the output having a mating portion including a coupling for each of the exposed elements, wherein the output includes a second semiconductor active device thread; and electrically connecting the exposed elements to the output, including mating the tapered cuts together such that the couplings contact the exposed elements.

6. The method of claim 5, further comprising the step of weaving at least one of the semiconductor active device threads into a pre-existing fabric prior to the electrically connecting step.

7. The method of claim 5, wherein the plurality of constituent threads includes at least two of: a source thread, a drain thread, a gate thread, an optical thread, a spacer thread, a contact thread and a semiconductor thread.

8. The method of claim 5, wherein each of the semiconductor active device threads has a ribbon geometry.

9. A semiconductor active device thread connector system comprising:

an electrical connection for electrically connecting a semiconductor active device thread to an output, wherein the output includes another semiconductor active device thread, and wherein each semiconductor active device thread includes a plurality of constituent threads, each element of the each constituent thread being exposed, the electrical connection including one of:

a) a substantially conically-shaped end that exposes at least two elements of the semiconductor active device thread, and b) a tapered cut that exposes at least two elements of the semiconductor active device thread; and a mating portion on the output.

10. The system of claim 9, wherein the mating portion for the tapered cut includes a complementary tapered cut.

11. The system of claim 9, wherein the mating portion for the substantially conical end includes a complementary substantially conical end.

* * * * *